(12) United States Patent
Babilo et al.

(10) Patent No.: US 10,844,230 B2
(45) Date of Patent: Nov. 24, 2020

(54) SALT SPRAY-RESISTANT METAL-FILLED INFRARED REFLECTIVE COATING FOR AEROSPACE APPLICATION

(71) Applicant: THE BOEING COMPANY, Chicago, IL (US)

(72) Inventors: Peter Babilo, Mission Viejo, CA (US); Giuseppe A. Russo, Orange, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/426,635

(22) Filed: Feb. 7, 2017

(65) Prior Publication Data
US 2018/0223106 A1  Aug. 9, 2018

(51) Int. Cl.
| | | |
|---|---|---|
| *B32B 7/02* | (2019.01) | |
| *C09D 5/33* | (2006.01) | |
| *C09D 163/00* | (2006.01) | |
| *C08G 59/50* | (2006.01) | |
| *C08K 3/08* | (2006.01) | |

(52) U.S. Cl.
CPC ......... *C09D 5/004* (2013.01); *C08G 59/5006* (2013.01); *C09D 163/00* (2013.01); *C08K 2003/0812* (2013.01)

(58) Field of Classification Search
CPC .. C09D 163/00; C09D 163/04; C09D 163/06; C09D 163/08; C09D 163/10; C09C 1/40; C09C 1/64; C09C 1/644; C09C 1/646
See application file for complete search history.

(56) References Cited

U.S. PATENT DOCUMENTS

| | | | | |
|---|---|---|---|---|
| 3,356,647 | A * | 12/1967 | Budde, Jr. .......... | C08G 59/5013 528/107 |
| 3,962,397 | A * | 6/1976 | Narui .................. | C09C 1/62 264/144 |
| 2013/0149454 | A1 * | 6/2013 | Hara ................... | C09C 1/40 427/385.5 |
| 2015/0094400 | A1 * | 4/2015 | Zheng ................. | C08G 59/60 523/222 |

FOREIGN PATENT DOCUMENTS

JP  2001240808 A  *  9/2001

OTHER PUBLICATIONS

Machine Translation of JP 2001-240808 (Year: 2001).*
EPON Resin 828 Technical Data Bulletin. accessed Jan. 25, 2019 from http://www.chemcenters.com/images/Epon828.pdf (Year: 2005).*
Tetrahydrothiophene datasheet. accessed from https://cameochemicals.noaa.gov/report?key=CH4608 on Jan. 25, 2019 (Year: 2019).*

* cited by examiner

*Primary Examiner* — Prashant J Khatri
*Assistant Examiner* — Zachary M Davis
(74) *Attorney, Agent, or Firm* — Coats & Bennett, PLLC

(57) ABSTRACT

The present disclosure relates to highly reflective coating formulations that produce coatings having an average infrared reflectivity ranging from about 75% to about 90% at wavelengths ranging from about 0.5 μm to about 1000 μm, methods for making the coatings and coating mixtures, and substrates comprising such coatings.

23 Claims, 3 Drawing Sheets

SALT SPRAY-RESISTANT METAL-FILLED INFRARED REFLECTIVE COATING FOR AEROSPACE APPLICATION

STATEMENT OF POTENTIAL GOVERNMENT RIGHTS

This present U.S. Patent Applications contains claims to patentable subject matter in which the U.S. Government may have certain rights under USAF Contract Number FA8214-15-C-001.

TECHNOLOGICAL FIELD

The present disclosure generally relates to the field of highly reflective coatings. More particularly, the present disclosure relates to coatings that maintain high reflectivity in extreme environments.

BACKGROUND

Highly reflective coatings find particular utility as coatings for various substrates. Particular highly reflective coatings that maintain their reflectivity after exposure to extreme condition, including, for example, salt spray exposure have changed formulations through the years. Identifying improved replacement coatings having specified reflectivity and specified performance characteristics has proven difficult depending upon the attendant coating performance. Therefore, highly reflective coatings having particular color and performance requirements, such as maintaining a particular degree of reflectivity in extreme environments and after to exposure to extreme environments, and methods for making the same, would be particularly advantageous.

BRIEF SUMMARY

Aspects of the present disclosure are related to a method of manufacturing an infrared reflective coating mixture comprising: combining a predetermined amount of a non-polar solvent, a predetermined amount of a leafing aluminum pigment, a predetermined amount of a liquid epoxy resin, and a predetermined amount of a curing agent to form an infrared reflective coating mixture.

Aspects of the present disclosure are further directed to a method for manufacturing an infrared reflective coating comprising combining a predetermined amount of a leafing aluminum pigment with a predetermined amount of a non-polar solvent to yield a leafing aluminum pigment mixture, combining a predetermined amount of an aliphatic amine-containing curing agent with a predetermined amount of a liquid epoxy resin to yield a resin mixture, combining the leafing aluminum pigment mixture with the resin mixture at a pigment to binder ratio of about 0.1 to 1.0 to yield a coating mixture, and curing the coating mixture, wherein the infrared reflective coating comprises an average infrared reflectivity ranging from about 75% to about 90% at wavelengths ranging from about 0.5 µm to about 1000 µm.

In a further aspect, in the step of combining a predetermined amount of a leafing aluminum pigment with a predetermined amount of a non-polar solvent to yield a leafing aluminum pigment mixture, the predetermined amount of the non-polar solvent comprises a predetermined amount of a non-polar solvent comprising a predetermined amount of toluene, xylene, hexane, or combinations thereof.

In another aspect, in the step of combining a predetermined amount of an aliphatic amine-containing curing agent with a predetermined amount of a liquid epoxy resin to yield a resin mixture, the predetermined amount of the liquid epoxy resin comprises a predetermined amount of bisphenol A diglycidyl ether liquid epoxy resin.

In yet another aspect, in the step of combining a predetermined amount of an aliphatic amine-containing curing agent with a predetermined amount of a liquid epoxy resin to yield a resin mixture, the aliphatic amine-containing curing agent comprises a predetermined amount of tetraethylenepentamine (TEPA), triethylenetetramine (TETA), or combinations thereof.

In a further aspect, in the step of combining a predetermined amount of an aliphatic amine curing agent with a predetermined amount of a liquid epoxy resin to yield a resin mixture, the predetermined amount of the curing agent comprises a predetermined amount of an aliphatic amine-containing curing agent, wherein the aliphatic amine-containing curing agent has an amine hydrogen equivalent weight (AHEW) ranging from about 90 to about 150 (equivalent weight/active hydrogen).

In a further aspect, in the step of combining a predetermined amount of a leafing aluminum pigment with a predetermined amount of a non-polar solvent to yield a leafing aluminum pigment mixture, the predetermined amount of the non-polar solvent ranges from about 45 wt % to about 70 wt %.

In another aspect, in the step of combining a predetermined amount of a leafing aluminum pigment with a predetermined amount of a non-polar solvent to yield a leafing aluminum pigment mixture, the predetermined amount of the leafing aluminum pigment ranges from about 3 wt % to about 5 wt %.

In another aspect, in the step of combining a predetermined amount of an aliphatic amine-containing curing agent with a predetermined amount of a liquid epoxy resin to yield a resin mixture, the predetermined amount of the liquid epoxy resin ranges from about 15 wt % to about 30 wt %.

In a further aspect, in the step of combining a predetermined amount of an aliphatic amine-containing curing agent with a predetermined amount of a liquid epoxy resin to yield a resin mixture, the ratio of the predetermined amount of liquid epoxy resin-to-the predetermined amount of the aliphatic amine curing agent is about 1.0-to-0.7.

In another aspect, after the step of combining a predetermined amount of the leafing aluminum pigment in a predetermined amount of the non-polar solvent to yield a leafing aluminum pigment mixture, further comprises applying a centrifugal mixer to the leafing aluminum pigment mixture to mix the leafing aluminum pigment mixture.

Yet another aspect of the present disclosure is directed to a method for applying an infrared reflective coating to a substrate comprising delivering an amount of an infrared reflective coating mixture to the substrate, with the infrared reflective coating mixture comprising a resin mixture and a leafing aluminum pigment mixture combined together to yield the infrared reflective coating mixture. The resin mixture comprises a liquid epoxy resin in an amount ranging from about 15 wt % to about 30 wt %, and an aliphatic amine-containing curing agent in an amount ranging from about 10 wt % to about 25 wt % to yield the resin mixture. The leafing aluminum pigment mixture comprises a leafing aluminum pigment in an amount ranging from about 3 wt % to about 5 wt %, and a predetermined amount of non-polar solvent to yield the leafing aluminum pigment mixture. The resin mixture and a leafing aluminum pigment mixture are combined together to yield the infrared reflective coating mixture, and the infrared reflective coating mixture is applied to the substrate, followed by curing the infrared reflective coating mixture to form the infrared reflective coating.

In a further aspect, the curing of the infrared coating mixture is conducted at room temperature.

In a further aspect, the curing of the infrared coating mixture is conducted at a temperature ranging from about 85° F. to about 450° F.

In another aspect, in the step of delivering an amount of infrared coating mixture, the infrared coating mixture is delivered to the substrate via spraying the infrared coating mixture onto the substrate to a thickness ranging from about 0.0007 to about 0.0015 inches.

A further aspect of the present disclosure is directed to an infrared reflective coating mixture, with the infrared reflective coating mixture comprising a resin mixture and a leafing aluminum pigment mixture combined together to yield the infrared reflective coating mixture. The resin mixture comprises a liquid epoxy resin in an amount ranging from about 15 wt % to about 30 wt %, and an aliphatic amine-containing curing agent in an amount ranging from about 10 wt % to about 25 wt % to yield the resin mixture. The leafing aluminum pigment mixture comprises a leafing aluminum pigment in an amount ranging from about 3 wt % to about 5 wt %; and a predetermined amount of a non-polar solvent to yield the aluminum pigment mixture, and wherein the infrared reflective coating mixture comprises a pigment to binder ratio of about 0.1:1.0.

In a further aspect, the aliphatic amine curing agent has an amine hydrogen equivalent weight ranging from about 90 to about 150 (equivalent weight/active hydrogen).

In another aspect, the coating mixture comprises a solids content of about 50 wt %.

In a further aspect, the coating mixture has a solids content ranging from about 15 wt % to about 30 wt %.

In a further aspect, the liquid epoxy resin comprises a bisphenol A diglycidyl ether liquid epoxy resin.

A further aspect of the present disclosure, is directed to an infrared reflective coating, with the coating made from an infrared reflective coating mixture, with the coating mixture comprising a resin mixture and a leafing aluminum pigment mixture combined together to yield the infrared reflective coating mixture. The resin mixture comprises an epoxy resin in an amount ranging from about 15 wt % to about 30 wt %, and an aliphatic amine-containing curing agent in an amount ranging from about 10 wt % to about 25 wt % to yield the resin mixture. The leafing aluminum pigment mixture comprises a leafing aluminum pigment in an amount ranging from about 3 wt % to about 5 wt % and a predetermined amount of a non-polar solvent, wherein the infrared reflective coating mixture comprises a pigment to binder ratio of about 0.1:1.0, and wherein the infrared reflective coating has an average reflectivity ranging from about 75% to about 90% at wavelengths ranging from about 0.5 µm to about 1000 µm.

A further aspect of the present disclosure is directed to a substrate comprising an infrared reflective coating, said coating made from a coating mixture, the coating mixture comprising a resin mixture and a leafing aluminum pigment mixture combined together to yield the infrared reflective coating mixture. The resin mixture comprises an epoxy resin in an amount ranging from about 15 wt % to about 30 wt %, an aliphatic amine-containing curing agent in an amount ranging from about 10 wt % to about 25 wt % to yield the resin mixture. The leafing aluminum pigment mixture comprises a leafing aluminum pigment in an amount ranging from about 3 wt % to about 5 wt %; and a predetermined amount of a non-polar solvent to yield the aluminum pigment mixture.

In a further aspect, the substrate comprising the infrared reflective coating has an average infrared reflectivity ranging from about 75% to about 90% at wavelengths ranging from about 0.5 µm to about 1000 µm.

In a further aspect, an object comprises a substrate comprising an infrared reflective coating, with the coating made from a coating mixture. The coating mixture comprises a resin mixture and a leafing aluminum pigment mixture combined together to yield the infrared reflective coating mixture. The resin mixture comprises an epoxy resin in an amount ranging from about 15 wt % to about 30 wt %, and an aliphatic amine-containing curing agent in an amount ranging from about 10 wt % to about 25 wt %. The leafing aluminum pigment mixture comprises a leafing aluminum pigment in an amount ranging from about 3 wt % to about 5 wt %; and a non-polar solvent, and the infrared reflective coating comprises an average infrared reflectivity ranging from about 75% to about 90% at wavelengths ranging from about 0.5 µm to about 1000 µm.

In a further aspect, the substrate comprises aluminum.

In another aspect, the object is a stationary structure.

In another aspect, the object is a vehicle.

In another aspect, the vehicle comprises a manned/unmanned aircraft; a manned/unmanned spacecraft; a manned/unmanned rotorcraft; a missile, a rocket, a manned/unmanned terrestrial vehicle; a manned/unmanned surface water borne vehicle; a manned/unmanned sub-surface water borne vehicle; or combinations thereof.

BRIEF DESCRIPTION OF THE DRAWINGS

Figure 1:
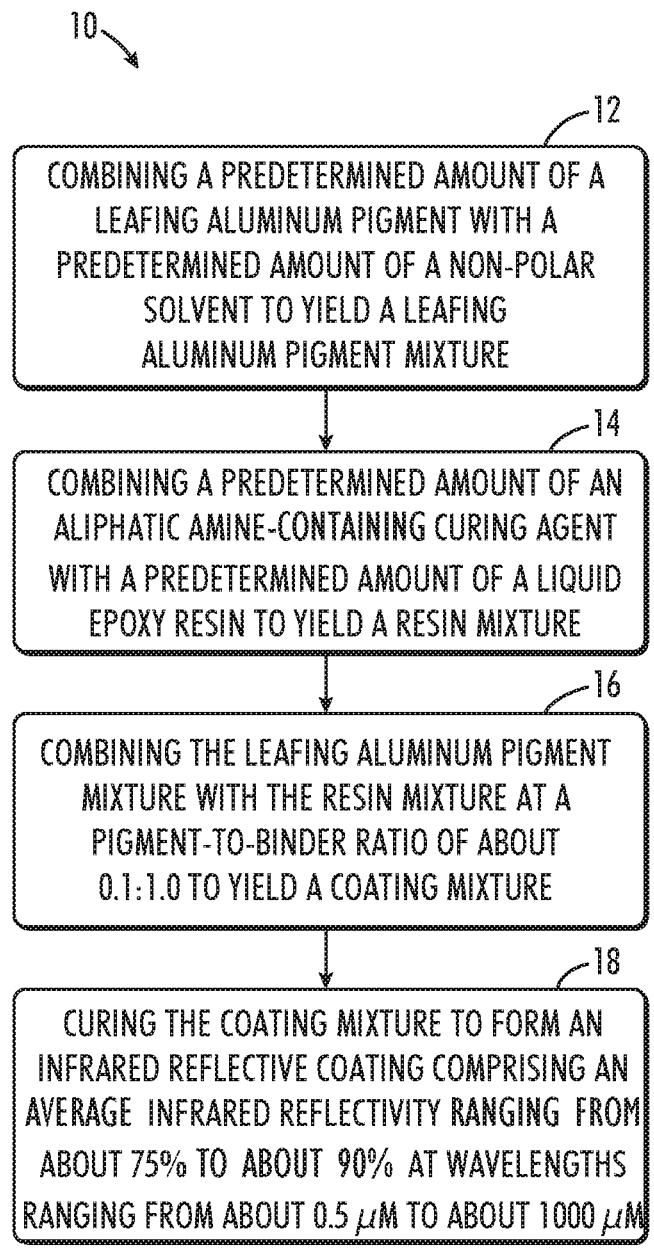
Figure 2:
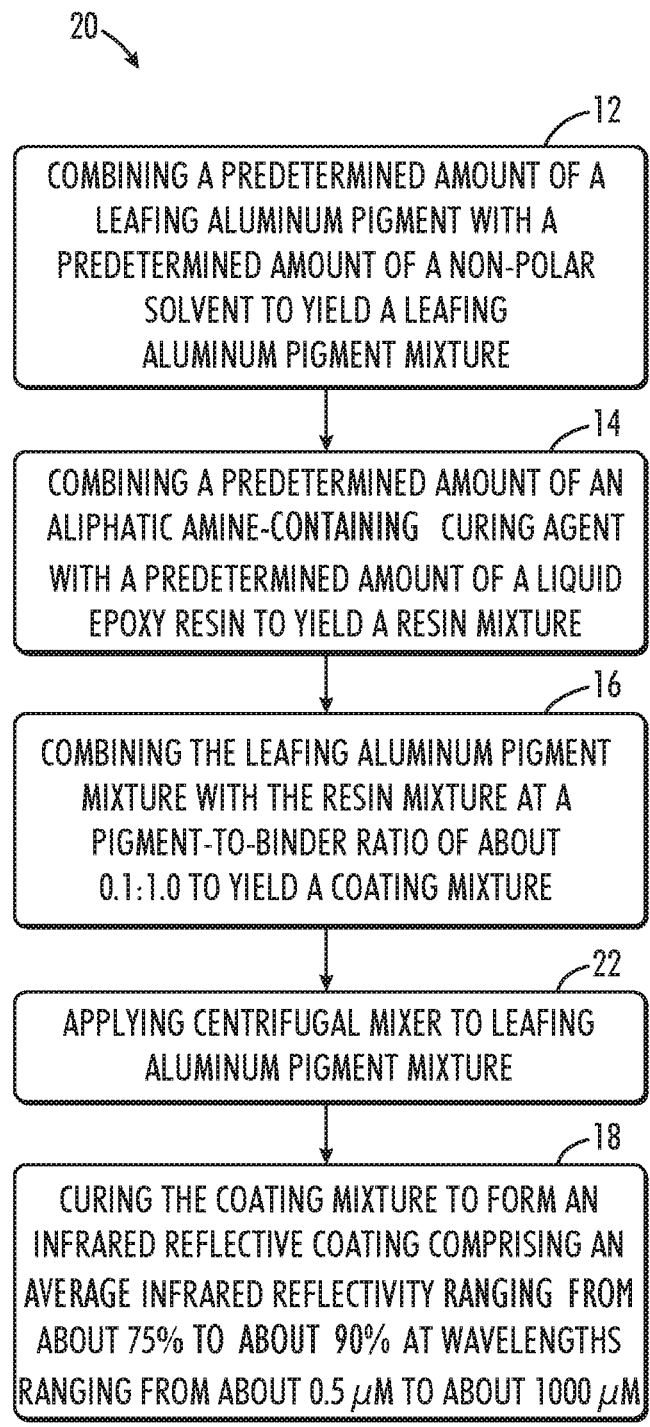

Having thus described variations of the disclosure in general terms, reference will now be made to the accompanying drawings, which are not necessarily drawn to scale, and wherein:

FIG. 1 is a flowchart outlining an aspect of the present disclosure;

FIG. 2 is a flowchart outlining an aspect of the present disclosure; and

Figure 3:
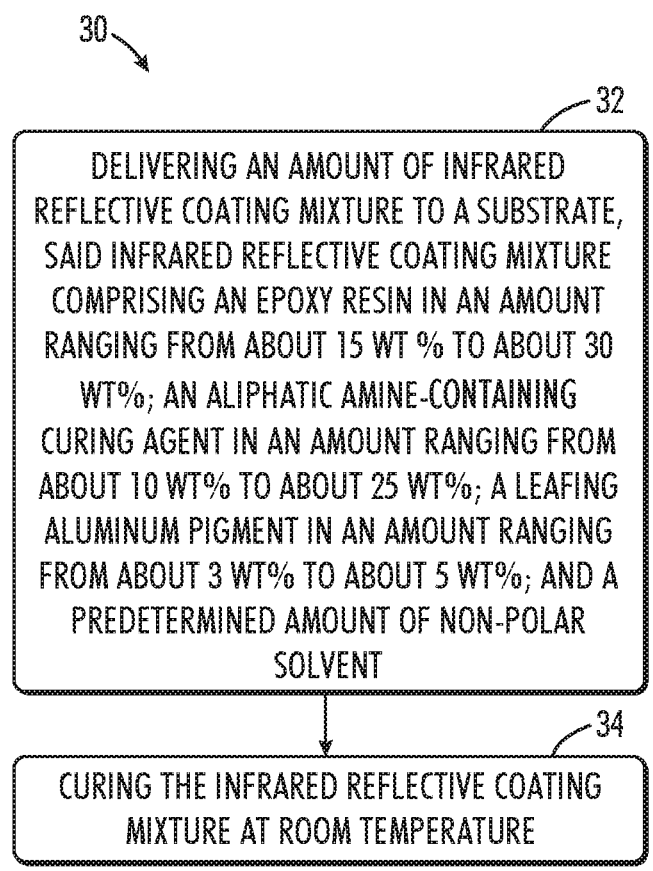

FIG. 3 is a flowchart outlining an aspect of the present disclosure.

DETAILED DESCRIPTION

Aspects of the present disclosure are directed to highly reflective infrared coatings, coating mixtures, methods for making and applying the same, and structures coated with such coatings. It has now been determined that successful highly reflective infrared coatings, also equivalently referred to herein as "reflective infrared coatings", can be made by incorporating a predetermined amount of a liquid epoxy resin-containing compound with a predetermined amount of a particular leafing metal pigment in a predetermined amount of a non-polar solvent in combination with a curing agent that is preferably an aliphatic amine curing agent. Infrared radiation is understood to be invisible radiant energy (e.g., electromagnetic radiation) having wavelengths longer than those of visible light, thus extending from the nominal red edge of the visible spectrum at about 0.7 micrometers (µm) (frequency 430 THz) to about 1,000,000 nm (1000 micrometers (µm)(frequency 300 GHz). For the purpose of the present disclosure, "highly infrared reflective properties or characteristics", refer to reflective properties or characteristics, such as average infrared reflectivity ranging from about 75% to about 90% infrared reflectivity, at wavelengths ranging from about 0.5 µm to 1000 µm. That is, when taking reflectivity measurements at infrared wavelengths across the infrared spectrum, the average of the infrared reflectivity values taken across the infrared wavelength spectrum measures from about 75% to about 90% reflectivity. It is therefore understood that, at various wavelengths within the infrared wavelength range, the specific infrared reflectivity value taken at a specific infrared wavelength may be less than 75%, or may exceed 90% or even 95%, but the average of the infrared reflectivity values taken over the infrared wavelength spectrum (e.g., ranging from about 0.5 µm to 1000 µm) will range from about 75% to about 90% reflectivity.

The average reflectivity values achieved according to the present disclosure are achieved and substantially maintained after exposure to extreme environmental conditions including, for example, after salt spray exposure. Further, such highly reflective infrared coatings of the present disclosure are curable at elevated temperature ranging from upper limits of "room temperature" (e.g., about 85° F.) to about 450° F. According to further aspects, the highly reflective infrared coatings and coating mixtures of the present disclosure are also curable at room temperature (without sacrificing the highly reflective properties and other characteristics, such as, for example, superior resistance to environmental factors including, for example and without limitation, corrosion, etc.). For the purpose of this application, "room temperature" is understood to range from about 68° F. to about 85° F. The terms "infrared reflectivity" and "reflectance of infrared wavelengths" are used equivalently herein.

To achieve a specific degree of high average infrared reflectivity, or average range of high infrared reflectivity, it has now been determined that the disclosed coating mixtures and resultant coatings benefit from specified and predetermined pigment-to-binder ratios, and when preferred curing agents are incorporated, the disclosed coating mixtures can be cured below curing temperatures conventionally thought to be necessary to achieve high levels of average infrared reflectivity, and, as mentioned above, can be cured at room temperature without sacrificing predetermined performance characteristics.

The infrared reflective coatings and coating mixtures made according to aspects of the present disclosure contribute to the thermal control of the coatings applied to substrates, as well as contributing to the thermal control of the substrates coated with the coatings of the present disclosure. Thermal control, according to the present disclosure, refers to the ability to control (maintain or change in a predetermined fashion) the temperature of a region or regions of a substrate coated with the coatings of the present disclosure, as well as the ability to control (maintain or change in a predetermined fashion) the temperature of a region or regions of the coating itself.

According to an aspect of the present disclosure, a high infrared reflectivity coating is made by combining a predetermined amount of a leafing aluminum pigment in a non-polar solvent with a predetermined amount of a liquid epoxy resin, including, for example a bisphenol A diglycidyl ether, along with an predetermined amount of curing agent. When the curing agent is an aliphatic amine-containing compound, it has now been determined that curing of the applied coating mixture into an applied coating can be conducted at room temperature, while retaining a high average infrared reflectivity of from about 75% to about 90% reflectivity throughout the infrared range and therefore at wavelengths greater than about 0.5 µm up to about 1000 µm. It is understood that curing regimens also may be employed at temperatures above room temperature, if desired. Such contemplated elevated temperature curing regimens comprise curing for predetermined times at predetermined temperatures ranging from about 85° F. to about 450° F. More typically, elevated curing of epoxy resin-containing formulations is understood to take place at temperatures ranging from about 350° F. to about 450° F. Therefore, for the purpose of this application, elevated curing of the compositions relating to aspects of the present disclosure is understood to also be possible (in addition to room temperature curing) and can occur at predetermined temperatures ranging from about 85° F. to about 450° F.

Suitable aliphatic amine-containing curing agents include, for example, aliphatic amine-containing curing agents comprising tetraethylenepentamine (TEPA), triethylenetetramine (TETA), as well as commercially available aliphatic amine-containing curing agents including, for example, and without limitation, Epikure 3300 (Hexion Specialty Chemicals, Houston, Tex.), Ancamide 2050 (Air-Products and Chemicals, Inc., Allentown, Pa.), etc. It is understood that many commercially available aliphatic amine-containing curing agents (e.g., Ancamide 2050) may also contain polyamide adducts. Polyamide adducts are understood to be amide functional macromolecules formed by controlled polyaddition of polyamides with various compounds especially epoxy resins. Polyamide adducts, due to their higher glass-transiton temperature (Tg) than polyamides, provide a partial physical drying ability for epoxy resins which in turn leads to an increase in cure rate.

The specific incorporation of curing agent Ancamide 2050 has presently been determined to produce improved cure rates for high infrared reflectivity coatings disclosed herein, including room temperature curing, while retaining very high infrared reflectivity and corrosion resistance, even after exposure to harsh environmental conditions. High infrared reflectivity, as stated above, refers to infrared reflectivity of greater than about 0.5 µm, and ranging from about 0.5 iLim to about 1000 µm. Curing agent Ancamide 2050 is a modified aliphatic amine-containing compound having an AHEW (amine hydrogen equivalent weight) of about 150. AHEW is understood to be the molecular weight of the compound divided by the number of active hydrogen per molecule. It is believed that aliphatic amine-containing compounds having an AHEW ranging from about 90 to about 150 can be substituted for Ancamide 2050 and impart similar curing characteristics to the high infrared reflectivity coatings and coating mixtures disclosed herein.

The epoxy resin component of the coatings disclosed herein is preferably a bisphenol A diglycidyl ether. Such epoxy resins are marketed commercially, for example, under the tradename EPON™ (Hexion). EPON™ 828 is one such undiluted clear difunctional bisphenol A diglycidyl ether.

The ability of an aluminum pigment to leaf in a liquid coating is, as least in part, a function of the fatty acid lubricant used during the milling process. Generally, a fatty acid such as stearic acid is employed, which coats the metal surface providing hydrophobic and oleophobic (non-wetting) characteristics. Without being bound to any particular theory, these non-wetting characteristics are, at least in part, thought to be responsible for the leafing properties of the pigment. When properly formulated and applied, a coating containing a leafing pigment provides a solid bright silver finish. The flakes typically orient substantially parallel to each other and to the coating substrate at or near the coating surface. This orientation creates a substantially continuous metallic flake barrier, and creates a surface that will reflect light in a highly specular manner. This characteristic is also useful in protecting the underlying coating film from degradation due to UV light and environmental exposure, including, for example and without limitation, corrosion.

Nickel, aluminum, stainless steel and zinc leafing flakes were studied for use as the leafing pigment for the high infrared reflectivity coatings of the present disclosure. However, aluminum leafing flakes were found to provide the highest degree of infrared reflectivity in the presently disclosed coating formulations that also withstood, in predetermined fashion, combinations of environmental challenges in terms of, for example and without limitation, corrosion resistance. Eternabrite Premier 251 and 301-1 aluminum leafing flakes (Silberline, Tamaqua, Pa.) were tested in accordance with aspects of the present disclosure and were found to offer particular utility to formulations having and retaining high average infrared reflectivity (e.g., ranging from about 75% to about 90% at wavelengths ranging from about 0.5 µm to about 1000 µm) even after being subjected to harsh environmental (e.g. corrosion) conditions simulated by salt spray testing. According to aspects of the present disclosure, tested coatings comprising aluminum leafing flakes did not degrade after salt spray exposure. Further characteristics of aluminum leafing flakes for use in conjunction with aspects of the present disclosure include: specific gravity, ranging from about 1.49 to about 1.65; particle sizes, ranging from about 14 µm to about 17 µm; etc. As mentioned above, it is understood that contemplated metal leafing flakes comprise particles lubricated with, for example, fatty acids.

Non-polar solvents were selected for incorporation in the coating formulations discussed herein since it was determined that non-polar solvents would promote maximum leafing of the metal leaf component or leaf metal product (also referred to equivalently herein as metal leafing flakes) in the coating mixture. As mentioned above, leafed metal products are known to commonly comprise a fatty acid coating (e.g. stearic acid). As a result, polar solvents were avoided in the presently disclosed formulations since it was determined that a polar solvent could strip the acid from the surface of the leafed metal, thereby degrading the leafing characteristics, and stripped fatty acids would interfere with the compatibility of the pigment mixture with epoxy resin mixtures as the fatty acids would separate from the mixture (e.g. float to the surface of the mixture). Suitable non-polar solvents include non-polar toluene-containing, xylene-containing, and hexane-containing solvents.

It has now been determined that highly reflective infrared coatings can be made by combining a predetermined amount of a leafing aluminum pigment with a predetermined amount of a non-polar solvent to yield a leafing aluminum pigment solution. A predetermined amount of aliphatic amine-containing curing agent is combined with a predetermined amount of a liquid epoxy resin to yield a resin mixture. The leafing aluminum pigment mixture was combined with the resin mixture at a pigment-to-binder ratio of about 0.1:1.0 (about 0.1) to yield a coating mixture, and curing the coating mixture to form an infrared reflective coating wherein the infrared reflective coating comprises an average infrared reflectivity ranging from about 75% to about 90% at wavelengths ranging from about 0.5 µm to about 1000 µm.

Experimental Results

Coatings were made by combining Eternabrite 301-1 or Eternabrite Premier 251 (Silbertine, Tamaqua, Pa.) aluminum leafing flakes and toluene to yield a leafing aluminum pigment mixture. The aluminum flakes were soaked in toluene two hours prior to incorporation into the epoxy resin system (EPON™ 828-Hexion) mixture. The soaking period allowed large agglomerates to break down and promote maximum leafing. A dual asymmetric centrifugal speed mixer was used to disperse the flakes into the toluene solvent to further assist in breaking down agglomerates. A small pigment-to-binder ratio was maintained (about 0.1 to 0.2). Solids content in the coating mixtures was maintained at from about 30% to about 50% to achieve predetermined coating thicknesses (thicknesses between about 0.7 and about 1.5 mils) in two coats when thinned no more than about 50% by volume. Maintaining a solids content of about 50% was also thought to have a viscosity suitable for use with a brush should touch ups be required (without additional thickening or thinning). The coatings were further able to be sprayed when diluted to a solids content ranging from about 15 wt % to about 30 wt %. According to one aspect, coating formulations as tested are shown in Table 1.

TABLE 1

| Ingredient | | Wt % |
|---|---|---|
| Epoxy Resin (Binder) | EPON ™ 828 | 27.4 |
| Polyamide Curing Agent | Ancamide 2050 | 19.2 |
| Aluminum Leafing Metal | Eternabrite (301-1) or (251) | 4.1 |
| Solvent | Toluene | 49.3 |
| % Solids = 50.7% | | |
| PBR = 0.1 | | |

A plurality of 3×3 inch aluminum 6061 test panels were prepared for coating by subjecting the test panels to methyl ethyl ketone (MEK) solvent wiping. Infrared reflective coating mixtures prepared according to methods set forth above were used to coat the test panels. Coatings were applied to the test samples by thinning the coating mixture with toluene to about 50% by volume. A volume of coating mixture was provided to a spray gun (DeVilbliss HVLP spray gun COMM-HS1-12), with the coating mixture delivered via spraying to the test panel surfaces in two spray passes producing a coating having a thickness of about 1 mil (0.5 mil per pass). According to aspects of the present disclosure, formulations were prepared for application to the substrate material via spraying by diluting the amount of the epoxy resin to a concentration of from about 15 wt % to about 30 wt %, and more preferably from about 18 wt % to about 27 wt %. The coating that was produced appeared smooth and uniform. A first set of coated test panels were cured at 350° F. for two hours. A second set of coated test panels were cured at room temperature for 7 days. Coating thicknesses were determined by measurement with a micrometer and Eddy current techniques.

Coating adhesion to the test panels was tested by subjecting the coated test panels to FED-STD 141 Method 6301.3 (Wet Tape Test). The tested panels from both curing regimens (350° F. and room temperature) passed the adhesion testing.

Reflectivity of the coated test panels was determined for wavelengths between 0.5 and 15 µm. Reflectance from 0.5 µm to 2.5 µm was measured using a Perkins-Elmer Lambda 900 spectrophotometer with an integrating sphere (near normal incidence, 8 degrees). Reflectance from 2.0 µm to 15 µm was measured using a Surface Optics SOC 100 HDR spectrophotometer (near normal incidence, 10 degrees). Overlapping wavelengths were averaged between the two instruments. Reflectance was averaged from the readings taken at 0.5 µm wavelength intervals across the 0.5 µm to 15 µm wavelength range.

Thickness measurements on coated coupons were conducted, along with tests for surface resistivity, and as-sprayed reflectance measurement. Two passes of spray coating resulted in approximately 0.001 inches thick cured coating. Thicknesses were confirmed using a micrometer and Eddy current techniques. Infrared reflectance measurements for resin systems tested resulted in a reflectance percentage of about 75% or greater at wavelengths ranging from about 0.5 µm to about 1000 µm for coated aluminum test panels cured at room temperatures and curing at 350° F. When aliphatic amine-containing curing agents (e.g. Ancamide 2050 and 2386) were incorporated into the coating formulation, the reflectance rate was substantially equivalent for curing at both room temperatures and at 350° F. See Table 2. Coating formulations list the epoxy-curing agent-flake—containing compositions according to aspects of the present disclosure. Therefore "EPON" refers to the epoxy binder EPON™ 828; "3300" refers to the curing agent Epikure 3300. "2386" refers to the curing agent Ancamide 2386; "2050" refers to the curing agent Ancamide 2050; "Al301" refers to Eternabrite 301-1 Aluminum Flakes; and "Al251" refers to Eternabrite 251 Aluminum flakes.

TABLE 2

| Coating Formulation (in Toluene) | Thickness (in.) | Surface Resistivity (ohm/sq) | Reflectance 350° F., 2 hr. cure | Reflectance Room Temp cure, 7 days |
|---|---|---|---|---|
| EPON-3300-Al301 | 0.0009 | >10¹⁰ | 81% | 83% |
| EPON-3300-Al251 | 0.0010 | >10¹⁰ | 86% | 77% |
| EPON-2386-Al251 | 0.0011 | >10¹⁰ | 87% | 86% |
| EPON-2050-Al251 | 0.0010 | >10¹⁰ | 87% | 86% |

The test panels were exposed to humidity in accordance with Procedure 1 of MIL-E-5272 with an upper temperature limit of 66° C. (150.8° F.) for the testing cycle. A Thermotron SM-1.0-3200 humidity chamber was used with the results as shown in Table 3.

TABLE 3

| Step | Temp. (° F.) | Humidity (%) | Time (hrs.) |
|---|---|---|---|
| 1 | 25-66 | 40-95 | 2 |
| 2 | 66-66 | 95-95 | 6 |
| 3 | 66-25 | 95-95 | 16 |

A first set of coated test panels were subjected to salt spray testing by exposing the coated test panels to a 5% salt spray test for 5 days per ASTM D 117. A second set of coated test panels were subjected to salt spray testing by exposing the coated test panels to a 20% salt spray for 48 hours in accordance with Method 811 of FED-STD-151.

Elevated (high) temperature resistance of the coatings on the coated test panels was tested by heating the coated test panels to 350° F. within 60 seconds prior to quenching the coated test panels in deionized water. It was determined that, at elevated cure (350° F.) and room temperature cure, coating formulations comprising an aliphatic amine curing agent withstood exposure with no observed lifting, blistering, dissolving, loss of gloss or color, or significant softening. It was further presently determined that the coating formulations comprising an aliphatic amine-containing curing agent (e.g. Ancamide 2050 (Air Products and Chemicals, Inc., Allentown, Pa.) produced superior coatings with respect to high infrared reflectance (greater than about 75% at wavelengths greater than about 0.5 µm), even after the salt spray testing (20% salt spray), and showed no observable difference regarding which curing regimen was used (i.e. elevated cure of 350° F. or room temperature cure).

Surface tensions of the coating compositions comprising various non-polar solvents under consideration were tested, as it was initially believed that high surface tension solvents may promote better leafing. It was presently surprisingly determined, however, that known high surface tension solvents did not necessarily impart the best infrared reflectivity characteristics to the coating mixtures. Several non-polar solvent system and solvent blends were tested, as shown in Table 4. While use of toluene yielded the lowest surface tension value of the solvents tested, it was determined that, between xylene and toluene, coating formulations comprising toluene yielded test panels having a 2% improved infrared reflectance as compared to the test panels coating with formulations comprising xylene. See Table 4.

TABLE 4

| Solvent | Surface Tension (mN/m) |
|---|---|
| Diethylene glycol | 45 |
| Ethylene glycol | 48 |
| Glycerol | 64 |
| N-methylpyrrolidinone (NMP) | 41 |
| Xylene | 30 |
| Toluene | 28 |

It was presently determined that a low pigment-to-binder ratio (PBR) appeared to have improved final visual coating quality. "Binder" is understood to refer to the liquid epoxy resin being used in the coating formulation. In the examples presented herein in Table 5, EPON™ 828, a bisphenol A diglycidyl ether was used. In addition, a predetermined low pigment-to-binder ratio improved the ability to spray the coating and achieve the predetermined coating thicknesses applied to a substrate while surprisingly retaining high infrared reflectivity of greater than about 75% at wavelengths ranging from about 0.5 µm to about 1000 µm. Table 5 shows aluminum leafing flake pigment effects on reflectance. The aluminum leafing flake pigments used were Eternabrite Premier 251 and 301-1 aluminum leafing flakes (Silberline, Tamaqua, Pa.).

TABLE 5

| Leaf | Al (251) | Al (251) | Al (251) | Al (301-1) | Al (301-1) | Al (301-1) |
|---|---|---|---|---|---|---|
| PBR | 0.1 | 0.2 | 0.5 | 0.1 | 0.2 | 0.5 |
| Solids % | 58 | 61 | 65 | 56 | 61 | 65 |
| Solvent | Toluene | Toluene | Toluene | Toluene | Toluene | Toluene |
| Average Reflectance % (0.5-15 µm) | 81.5 | 81.5 | 82.8 | 77.7 | 76.8 | 75.8 |

TABLE 5-continued

| Leaf | A1 (251) | A1 (251) | A1 (251) | A1 (301-1) | A1 (301-1) | A1 (301-1) |
|---|---|---|---|---|---|---|
| Reflectance % Post Salt 5% (5 days)- | 78.5 | 78.9 | 80.8 | 75.5 | 75.4 | 73.6 |

It was determined that the solids content of various coating formulations is about 50% by weight. Such a solids content in the range of about 50% provides a coating composition having a viscosity suitable for brushing as would be used for, for example, in a brushing application including, for example and without limitation, touch-up applications. However, as explained above, the solids content value of the coating formulations described herein may be adjusted to facilitate, for example, spray coating. For example, to facilitate predetermined application requirements and coating regimens to achieve predetermined coating thicknesses, the coating formulations of the present disclosure may be diluted to achieve solids contents ranging from about 30% to about 50%. Such altering of the solids content and other factors affecting viscosity of the coating mixtures and formulations disclosed herein can further facilitate applying the coating mixtures in non-spraying coating application formats, including, without limitation, brushing, pouring, etc. as may be required for touch-up operations during, for example, part repair and replacement, etc. Table 6 below sets forth a formulation that can be diluted for spray application. The formulation set forth in Table 6 has a total weight of 73 g, a solids content of 50.7% and a pigment-to-binder (PBR) ratio of 0.1. Table 7 sets forth the diluted values for the components, while maintaining a pigment-to-binder (PBR) ration of 0.1. Table 7 shows a total weight of 109 g, and a 33.9% solids content.

TABLE 6

| Ingredient | Weight (g) | % wt |
|---|---|---|
| EPON 828 | 20 | 27.4 |
| Ancamide 2050 | 14 | 19.2 |
| Leafing metal | 3 | 4.1 |
| Toluene | 36 | 49.3 |

TABLE 7

| Ingredient | Weight (g) | % wt |
|---|---|---|
| EPON 828 | 20 | 18.3 |
| Ancamide 2050 | 14 | 12.8 |
| Leafing metal | 3 | 2.8 |
| Toluene | 72 | 66.1 |

FIG. 1 is a flowchart illustrating an aspect of the present disclosure. A method (10) is shown comprising combining a predetermined amount of a leafing aluminum pigment with a predetermined amount of a non-polar solvent to yield about a leafing aluminum pigment mixture (12); combining a predetermined amount of an aliphatic amine-containing curing agent with a predetermined amount of a liquid epoxy resin to yield a resin mixture (14); combining the leafing aluminum pigment mixture with the resin mixture at a pigment-to-binder ratio of about 0.1:1.0 to yield a coating mixture (16); and curing the coating mixture to form an infrared reflective coating comprising an average infrared reflectivity of from about 75% to about 90% at wavelengths ranging from about 0.5 µm to 1000 µm (18).

FIG. 2 is a flowchart illustrating an aspect of the present disclosure. A method (20) is shown comprising combining a predetermined amount of a leafing aluminum pigment with a predetermined amount of a non-polar solvent to yield about a leafing aluminum pigment mixture (12); combining a predetermined amount of an aliphatic amine-containing curing agent with a predetermined amount of a liquid epoxy resin to yield a resin mixture (14); combining the leafing aluminum pigment mixture with the resin mixture at a pigment-to-binder ratio of about 0.1:1.0 to yield a coating mixture (16); applying a centrifugal mixer to the leafing aluminum pigment mixture to mix the leafing aluminum pigment mixture (22); and curing the coating mixture to form an infrared reflective coating comprising an average infrared reflectivity ranging from about 75% to about 90% at wavelengths ranging from about 0.5 µm to 1000 µm (18). Aspects shown in FIG. 1 relate to and can be incorporated into FIG. 2.

FIG. 3 is a flowchart illustrating an aspect of the present disclosure. A method (30) is shown comprising delivering an amount of infrared reflective coating mixture to a substrate, said infrared reflective coating mixture comprising an epoxy resin in an amount ranging from about 15 wt % to about 30 wt %, an aliphatic amine-containing curing agent in an amount ranging from about 10 wt % to about 25 wt %, a leafing aluminum pigment in an amount ranging from about 3 wt % to about 5 wt %, and a predetermined amount of a non-polar solvent (32); and curing the infrared reflective coating mixture at room temperature (34). Aspects shown in FIGS. 1 and 2 relate to and can be incorporated into FIG. 3.

Variations and alternatives of the present disclosure relate to the manufacture and coating of various substrates including, without limitation various components and parts such as, for example, component and parts of any dimension, including the manufacture and use of components and parts used in the fabrication of larger parts and structures. Such components and parts include, but are not limited to, components and parts designed to be positioned on the exterior or interior of stationary objects including, without limitation, bridge trusses, support columns, general construction objects, buildings, etc. Further components and parts include, without limitation, components and parts used in the manufacture of non-stationary objects including, without limitation, all vehicle types including, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, etc. and therefore include manned and unmanned aircraft, manned and unmanned spacecraft, manned and unmanned terrestrial vehicles, manned and unmanned non-terrestrial vehicles, manned and unmanned surface water-borne vehicles and objects and manned and unmanned sub-surface water-borne vehicles and objects.

When introducing elements of the present disclosure or exemplary aspects thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific aspects, the details of these aspects are not to be construed as limitations. While variations and alternatives of the present disclosure have been illustrated and described, it will be appreciated that various changes and substitutions can be made therein without departing from the spirit and scope of the disclosure.

What is claimed is:

1. A method of manufacturing an infrared reflective coating comprising:
    combining a predetermined amount of a leafing aluminum pigment with a predetermined amount of a non-polar solvent to yield a leafing aluminum pigment mixture, with the said leafing aluminum pigment having a particle size ranging from about 14 µm to about 17 µm said non-polar solvent present in the leafing aluminum pigment mixture in an amount ranging from about 45 wt % to about 70 wt % of the leafing aluminum pigment mixture;
    combining a predetermined amount of an aliphatic amine-containing curing agent with a predetermined amount of a liquid epoxy resin to yield a resin mixture; said liquid epoxy resin present in the resin mixture in an amount ranging from about 15 wt % to about 30 wt % of the epoxy resin mixture, and said amount of aliphatic amine-containing curing agent present in the resin mixture in an amount ranging from about 10 wt % to about 25 wt % of the epoxy resin mixture;
    combining the leafing aluminum pigment mixture with the resin mixture at a pigment-to-binder ratio of about 0.1:1.0 to yield a coating mixture;
    delivering the coating mixture to a substrate;
    curing the coating mixture at room temperature to form an infrared reflective coating;
    wherein the infrared reflective coating is configured to comprise an average infrared reflectivity ranging from about 75% to about 90% at wavelengths ranging from about 0.5 µm to about 1000 µm;
    wherein the amine-containing curing agent has an amine hydrogen equivalent weight (AHEW) ranging from about 90 to about 150;
    wherein the infrared reflective coating mixture is curable at room temperature; and
    wherein the non-polar solvent comprises a surface tension ranging from 28 mN/m to 30 mN/m.

2. The method of claim 1, wherein, in the step of combining a leafing pigment with a predetermined amount of a non-polar solvent, the predetermined amount of the non-polar solvent comprises a predetermined amount of toluene, xylene, hexane, or combinations thereof.

3. The method of claim 1, wherein, in the step of combining a predetermined amount of an aliphatic amine curing agent with a predetermined amount of liquid epoxy resin, the liquid epoxy resin comprises a predetermined amount of a bisphenol A diglycidyl ether liquid epoxy resin.

4. The method of claim 1, wherein, in the step of combining a predetermined amount of an aliphatic amine-containing curing agent with a predetermined amount of liquid epoxy resin, the aliphatic amine-containing curing agent comprises a predetermined amount of tetraethylenepentamine, triethylenetetramine or combinations thereof.

5. The method of claim 4, wherein, in the step of curing, the curing is conducted at room temperature.

6. The method of claim 1, wherein, in the step of combining a predetermined amount of a leafing aluminum pigment with a predetermined amount of a non-polar solvent, the predetermined amount of the leafing aluminum pigment ranges from about 3 wt % to about 5 wt %.

7. The method of claim 1, wherein, after the step of combining a predetermined amount of a leafing aluminum pigment with a predetermined amount of the non-polar solvent to yield a leafing aluminum pigment mixture, further comprising:
    applying a centrifugal mixer to the leafing aluminum pigment mixture.

8. An infrared reflective coating mixture comprising:
    an epoxy resin mixture mixed with a leafing aluminum pigment mixture to yield an infrared reflective coating mixture; said epoxy resin mixture comprising:
        a predetermined amount of liquid epoxy resin in an amount ranging from about 15 wt % to about 30 wt % of the epoxy resin mixture combined with a predetermined amount of aliphatic amine-containing curing agent in an amount ranging from about 10 wt % to about 25 wt % of the epoxy resin mixture; and
    said a leafing aluminum pigment mixture comprising:
        a predetermined amount of leafing aluminum pigment in an amount ranging from about 3 wt % to about 5 wt % of the leafing aluminum pigment mixture, with the leafing aluminum pigment having a particle size ranging from about 14 µm to about 17 µm, said leafing aluminum pigment combined with a predetermined amount of a non-polar solvent, said non-polar solvent present in the leafing aluminum pigment mixture in an amount ranging from about 45 wt % to about 70 wt % of the leafing aluminum pigment mixture;
    wherein the infrared reflective coating mixture comprises a pigment-to-binder ratio value of about 0.1:1.0;
    wherein the amine-containing curing agent has an amine hydrogen equivalent weight (AHEW) ranging from about 90 to about 150;
    wherein the infrared reflective coating mixture is curable at room temperature; and
    wherein the non-polar solvent comprises a surface tension ranging from 28 mN/m to 30 mN/m.

9. The infrared reflective coating mixture of claim 8, wherein the liquid epoxy resin comprises a bisphenol A diglycidyl ether liquid epoxy resin.

10. The infrared reflective coating mixture of claim 8, wherein the aliphatic amine-containing curing agent comprises a predetermined amount of tetraethylenepentamine.

11. The infrared reflective coating mixture of claim 8, wherein the aliphatic amine-containing curing agent comprises a predetermined amount of triethylenetetramine.

12. The infrared reflective coating mixture of claim 8, wherein the leafing aluminum pigment comprises aluminum leafing flakes, said aluminum flakes having a specific gravity ranging from about 1.49 to about 1.65.

13. The infrared reflective coating mixture of claim 8, wherein the non-polar solvent comprises at least one of: xylene, toluene, or hexane.

14. A highly infrared reflective coating for a substrate outer surface, said infrared reflective coating formed from an infrared reflective coating mixture that is cured, said infrared reflective coating mixture, comprising:
    an epoxy resin mixture mixed with a leafing aluminum pigment mixture and an amine-containing curing agent to yield an infrared reflective coating mixture; said epoxy resin mixture comprising:
  a predetermined amount of liquid epoxy resin in an amount ranging from about 15 wt % to about 30 wt % of the epoxy resin mixture;
said leafing aluminum pigment mixture comprising:
  a predetermined amount of leafing aluminum pigment in an amount ranging from about 3 wt % to about 5 wt % of the leafing aluminum pigment mixture, with the leafing aluminum pigment having a particle size ranging from about 14 µm to about 17 µm;
  a predetermined amount of a non-polar solvent in an amount ranging from about 45 wt % to about 70 wt % of the leafing aluminum pigment mixture;
said amine-containing curing agent having an amine hydrogen equivalent weight (AHEW) ranging from about 90 to about 150;
wherein the infrared reflective coating mixture comprises a pigment-to-binder ratio value of about 0.1:1.0;
wherein the leafing aluminum pigment comprises aluminum flakes, said aluminum flakes oriented substantially parallel to one another;
wherein the aluminum flakes provide a substantially continuous metallic flake barrier in the highly infrared reflective coating at a substrate outer surface;
wherein the highly reflective infrared coating has an average infrared reflectivity ranging from about 75% to about 90% over a wavelength range, said wavelength range ranging from about 0.5 µm to about 1000 µm; and
wherein the infrared reflective coating mixture is curable at room temperature.

15. A coated substrate comprising the highly infrared reflective coating of claim 14.

16. The substrate of claim 15, wherein the coated substrate has an average infrared reflectivity ranging from about 75% to about 90% over a wavelength range, said wavelength range ranging from about 0.5 µm to about 1000 µm.

17. The highly infrared reflective coating of claim 14, wherein the coating has an average infrared reflectivity ranging from about 75% to about 90% over a wavelength range, said wavelength range ranging from about 0.5 µm to about 1000 µm.

18. The highly infrared reflective coating of claim 14, wherein the leafing aluminum pigment comprises aluminum flakes, said aluminum flakes oriented substantially parallel to one another.

19. The highly infrared reflective coating of claim 14, wherein the leafing aluminum flakes provide a substantially continuous metallic flake barrier in the highly infrared reflective coating at a substrate outer surface.

20. The highly infrared reflective coating of claim 14, wherein the liquid epoxy resin comprises a bisphenol A diglycidyl ether liquid epoxy resin.

21. The highly infrared reflective coating of claim 14, wherein the aliphatic amine-containing curing agent comprises a predetermined amount of tetraethylenepentamine.

22. The highly infrared reflective coating of claim 14, wherein the leafing aluminum pigment comprises aluminum leafing flakes, said aluminum flakes having a specific gravity ranging from about 1.49 to about 1.65.

23. The highly infrared reflective coating of claim 14, wherein the non-polar solvent comprises at least one of: xylene, toluene, or hexane.

* * * * *